United States Patent [19]

Inoue et al.

[11] Patent Number: 5,724,041
[45] Date of Patent: Mar. 3, 1998

[54] SPREAD SPECTRUM RADAR DEVICE USING PSEUDORANDOM NOISE SIGNAL FOR DETECTION OF AN OBJECT

[75] Inventors: Kiyoshi Inoue; Haruhiko Ishizu, both of Atsugi; Ryuji Kohno, Yokohama, all of Japan

[73] Assignee: The Furukawa Electric Co., Ltd., Tokyo, Japan

[21] Appl. No.: 561,985

[22] Filed: Nov. 22, 1995

[30] Foreign Application Priority Data

Nov. 24, 1994 [JP] Japan .................................. 6-290139
Feb. 9, 1995 [JP] Japan .................................. 7-022077

[51] Int. Cl.[6] .................................................. G01S 13/93
[52] U.S. Cl. ........................... 342/70; 342/71; 342/72
[58] Field of Search .............................. 342/70, 71, 72

[56] References Cited

U.S. PATENT DOCUMENTS 3,735,398  5/1973  Ross .................................... 342/21
3,750,169  7/1973  Strenglein .......................... 342/21
4,443,799  4/1984  Rubin .................................. 375/1 X
5,274,380  12/1993  Yatsuka et al. ..................... 342/70

FOREIGN PATENT DOCUMENTS 5-249231   9/1993   Japan .
5-256936   10/1993  Japan .
2 259 820  3/1993   United Kingdom .

*Primary Examiner*—John B. Sotomayor
*Attorney, Agent, or Firm*—Frishauf, Holtz, Goodman, Langer & Chick

[57] ABSTRACT

A radar device transmits by a transmitting part a wave whose band is spread by a PN code from a PN generator, receives at a receiving part a reflected wave from an object based on the wave and detects the object by detecting correlation between the received signal and the PN code. In this radar device, the received signal which is spread to a wide range is converted to a low-frequency band which is easy to be measured by a down converter so that a signal is generated when correlation is made by a delay of the PN code from a delay circuit, and generates a pulse signal through waveform shaping of the signal to detect the object and to measure its relative speed and distance at a processing part according to the pulse signal and the delay time.

17 Claims, 10 Drawing Sheets

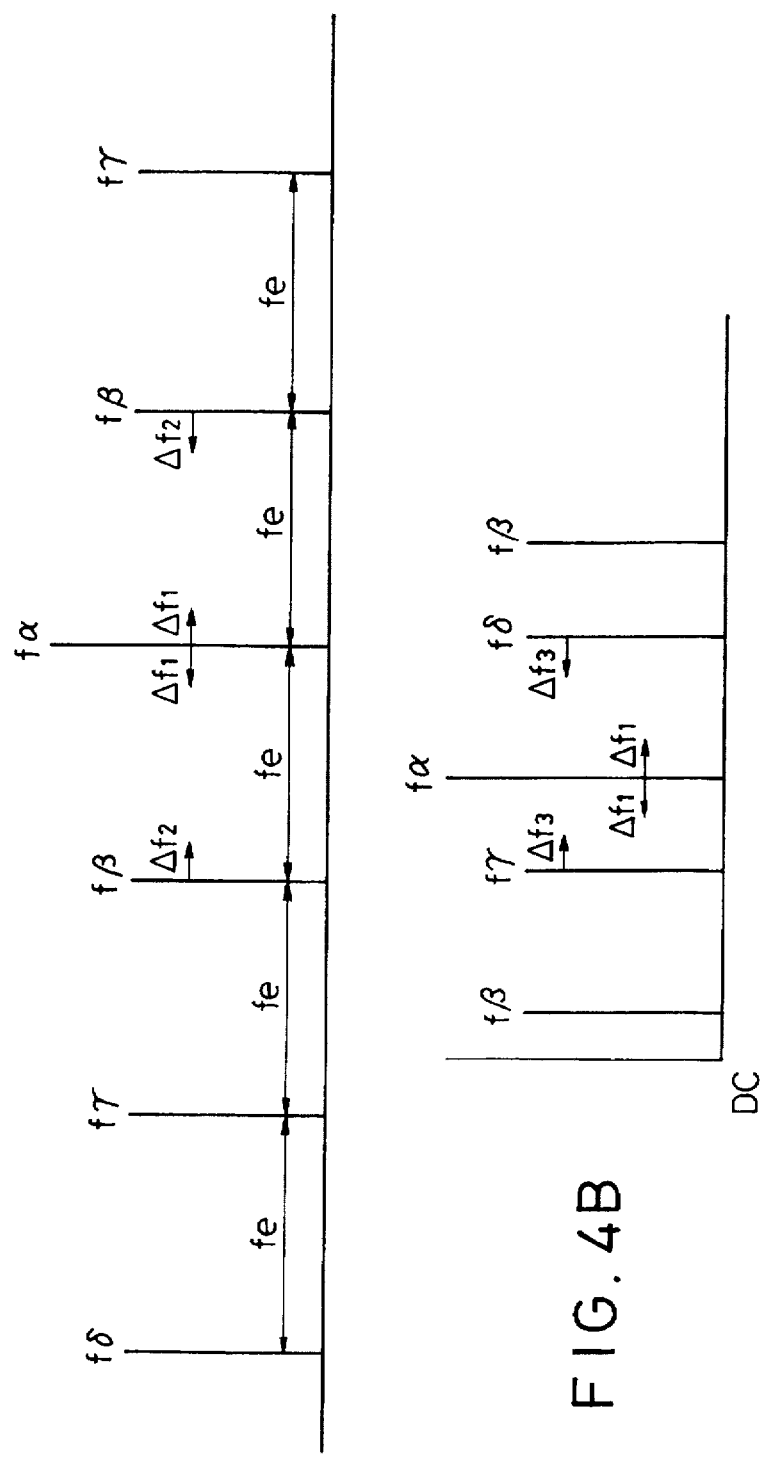

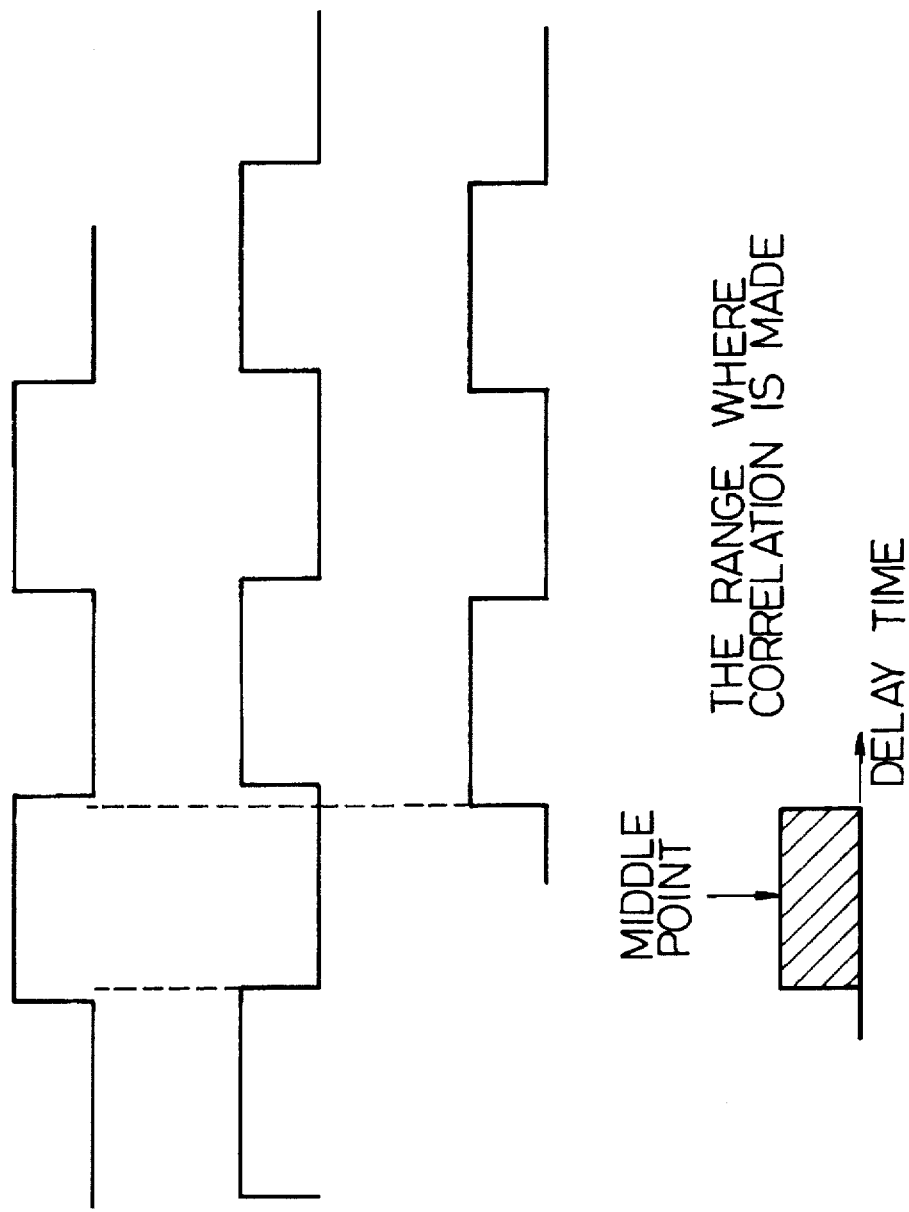

SPREAD SPECTRUM RADAR DEVICE USING PSEUDORANDOM NOISE SIGNAL FOR DETECTION OF AN OBJECT

BACKGROUND OF THE INVENTION

1. Field of the Invention

This invention relates to a radar device for detecting the presence of an object and measuring a relative speed and the distance to the object using a spread spectrum technique, and particularly to a radar device used as a radar for an automobile.

2. Description of the Related Art

Conventionally, such types of radar devices are known which use a sliding correlation method wherein rows of pseudorandom noise codes (hereinafter referred to as "PN code") are sequentially delayed and correlation with a reflected wave is checked in the direct sequence method.

As a device using this sliding correlation method, for example, there is known a device disclosed in Japanese Patent Publication (koukai) No. 5-256936, which provides a plurality of PN codes for receiving different sliding amounts in fine steps and checks correlation with a reflected wave.

However, it is necessary for the device in the Japanese Patent Publication (koukai) No. 5-256936 to provide independent correlation circuits and signal detection circuits for each of the plurality of PN codes for receiving with different sliding amounts. Thus, this prior art has a disadvantage that the scale of the circuits gets bigger and the manufacturing cost gets higher as well as that the circuits become complicated. Additionally, it also has a problem that a moving direction of an object can not be judged only with information on frequency shift.

There is also known a radar device using the sliding correlation method which acquires speed information in the secondary manner from a shift in distance information, but it has a problem that the time required for measurement is longer since the shift in distance should be observed for a certain period of time.

Moreover, there is known a radar device using the sliding correlation method that the duration of a chip and of a period of the PN code is determined by requirements of distance measurement accuracy and the maximum measured distance. But when the duration of the chip and one period of the chip is determined only by these requirements, as shown in FIG. 10, for example, reflected waves "a" and "b" from a plurality of objects (automobile "A" and "B") with different relative speeds v1 and v2 are received by an automobile "C" on which the radar device is mounted. And when the reflective wave "a" is correlated with the PN code, for example, the other reflected wave "b" acts as a noise and deteriorates measurement performance, which constitutes a disadvantage.

SUMMARY OF THE INVENTION

The present invention was made in view of the above problems and has an object to provide a radar device whose measurement time, the number of parts and size are reduced, cost is lowered and measurement performance is improved by measuring the distance to an object and the relative speed is measured at the same time in a common circuit.

Another object of the present invention is to provide a radar device whose noise resistance is improved.

Still another object of the present invention is to provide a radar device which can obtain a detection accuracy and a detection time in a certain range.

The above mentioned objects are achieved by a radar device according to the present invention. A radar device using a spread spectrum technique transmits a wave whose band is spread by a PN signal. And a reflected wave from an object based on this wave is received, and the object is detected by detecting the correlation between the received signal and the PN signal.

The radar device according to the present invention despreads the received signal with a pseudorandom noise signal by a despreading means constituted by a receiving part, converts the frequency of the received signal to a signal with a low frequency suitable for period measurement by a frequency converting means constituted by a down converter and passes it in a narrow band by a passing means constituted by a narrow-band filter. Also, an identifying means, a measuring means, a detecting means and a distance measuring device are constituted by a processing part. This processing part identifies presence of an object based on the passed signal, measures the period of the signal whose frequency was converted and detects a relative speed of the object based on this period. Also, in detecting correlation, a delay means constituted by a delay circuit delays the pseudorandom noise signal for a prescribed period of time, and the processing part measures the distance to the object according to the delay time when correlation is detected.

Also, in the radar device according to the present invention, a PN generator sets and generates a code of the pseudorandom noise signal according to a relative speed of a supposed object so that a shift range due to the Doppler effect of the frequency of the received signal which is correlated, converted to a low frequency and has power concentrated dose not overlap the shift range of the frequency of the signal which is not correlated but left spread, and so that the minimum value of the above shift range of the frequency of the signal with power concentrated is larger than "0" And at the receiving part, the received signal is despread by this generated pseudorandom noise signal and passed through the frequency shift range due to the Doppler effect of the frequency of the concentrated signal in the barrow-band filter so that only a frequency component with power concentrated can be taken out even if a plurality of reflected waves are received.

The radar device of the present invention is preferably provided with a phase locked loop (hereinafter referred to as "PLL") circuit for passing the signal whose frequency is converted at the down converter in the narrow-band filter. And this radar device reduces mixing of noise in a passing band using the PLL circuit.

The PLL circuit of the present invention is preferably provided with a phase comparator, a loop filter, a voltage controlled oscillator (hereinafter referred to as "VC0") and a feedback loop from this VCO to the phase comparator. And the PLL circuit takes in the frequency-converted signal, and the processing part detects presence of an object and measures speed or distance to the objectbased on an output from the loop filter or the VCO.

In the PLL circuit of the present invention, a lock-in range or lock range is preferably set in a frequency shift range where such a signal is supposed that is correlated at the receiving part, has power concentrated and frequency-converted at the down converter, and the lock-in range or lock range of this PLL circuit does not overlap a frequency shift range where such a spectrum is supposed that is not correlated at the receiving part but left spread, and frequency-converted at the down converter. And even if a plurality of reflected waves are received, only a frequency component with power concentrated is taken out of the reflected waves by the PLL circuit acting as a narrow-band filter.

The radar device of the present invention is preferably provided with a period duration measuring means constituted by the processing part for measuring the duration of one period and plural periods of a frequency-converted signal in a prescribed period of time. And the processing part obtains a detection accuracy and a detection time in a certain range by making the number of periods to be measured variable according to the period of the frequency-converted signal.

BRIEF DESCRIPTION OF THE DRAWINGS

FIGS. 4A-4B is a spectrum wave-form diagram for explaining a code setting condition for a PN code;

FIGS. 5A-5D is a wave-form diagram for explaining a distance detection action of a processing part;

DETAILED DESCRIPTION

A radar device according to the present invention will be explained referring to FIGS. 1 to 9.

Figure 1:
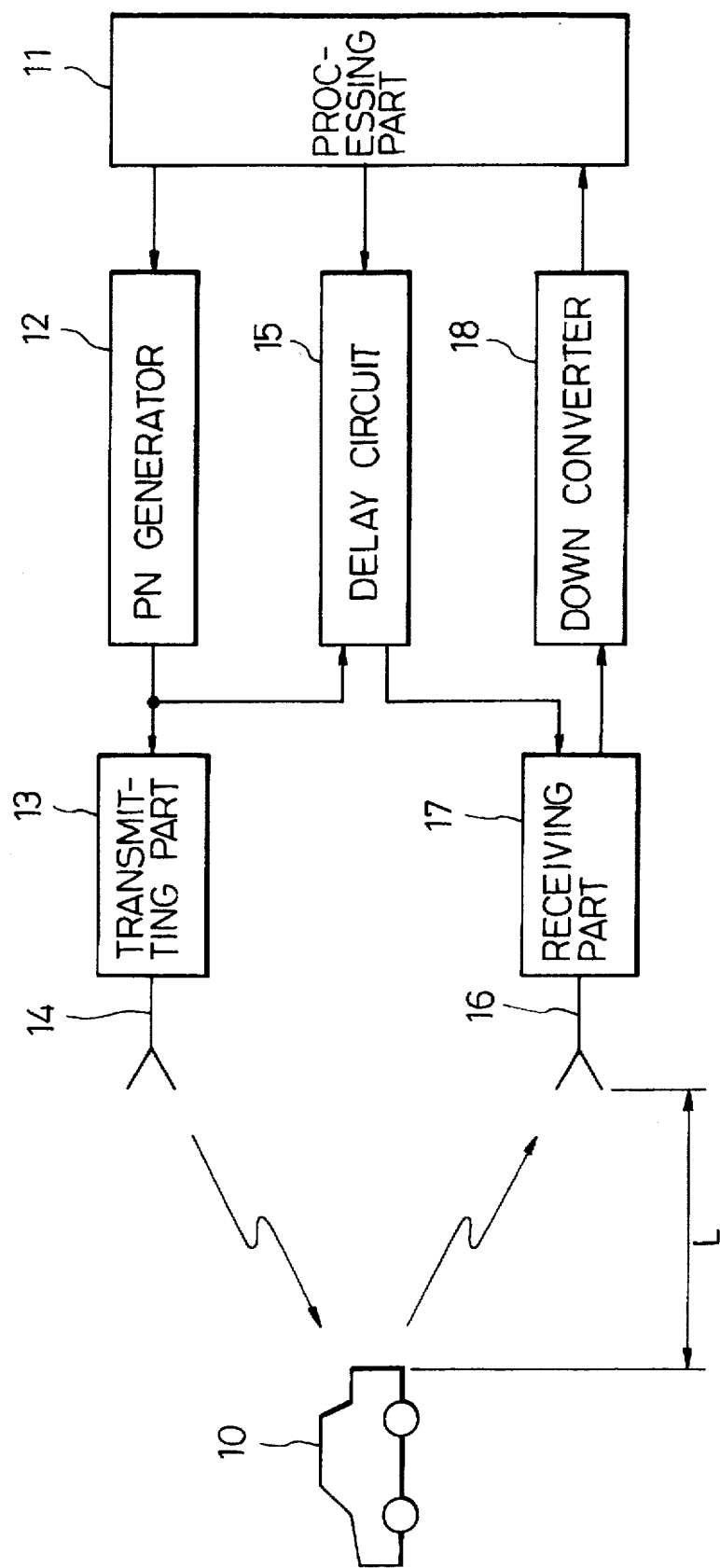
FIG. 1 is a block diagram showing schematic constitution of a preferred embodiment of a radar device according to the present invention.

FIG. 1 is a block diagram showing schematic constitution of a preferred embodiment of a radar device according to the present invention. Referring to FIG. 1, a radar device of the present invention comprises a processing part 11, a PN generator 12 connected to the processing part 11, a transmitting part 13 connected to the PN generator 12, an antenna for transmitting 14, a delay circuit 15 connected to the processing part 11 and the PN generator 12, an antenna for receiving 16, a receiving part 17 connected to the delay circuit 15, and a down converter 18 connected to the processing part 11 and the receiving part 17. The transmitting antenna 14 and the receiving antenna 16 can be provided in common for transmitting and receiving by a circulator or any other means.

The processing part 11 executes various control for the PN generator 12, the delay circuit 15, etc. and processing for a signal put in from the down converter 18, etc.

The PN generator 12 puts out a random PN code of a prescribed duration (period) to the transmitting part 13 and the delay circuit 15 under control of the processing part 11.

The transmitting part 13 transmits a wave whose band is spread by the direct sequence method. That is, the transmitting part 13 generates a high-frequency signal spread to a wide band by the PN code put in from the PN generator 12. This high-frequency signal is sent as a wave through the transmitting antenna 14. When the radar device of this preferred embodiment is used for a general automobile, for example, the signal generated at the transmitting part 13 is a signal in a millimetric wave band having an optimum frequency as radar, for example, a high-frequency signal of 60 GHz.

In the meantime, the delay circuit 15 delays the PN signal put in from the PN generator 12 by control of the processing part 11 by a prescribed time of t1 and puts it out to the receiving part 17.

The wave sent from this transmitting part 13 gets to an object 10 at a distance of, for example, "L", is reflected by the object 10 and received by the receiving part 17 through the receiving antenna 16 as a received signal. In this preferred embodiment, the time required for this wave put out of the transmitting antenna 14 to propagate through the distance 2L, the round trip of the distance to the object till it returns to the receiving antenna 16, is set as t2.

Figure 3A:
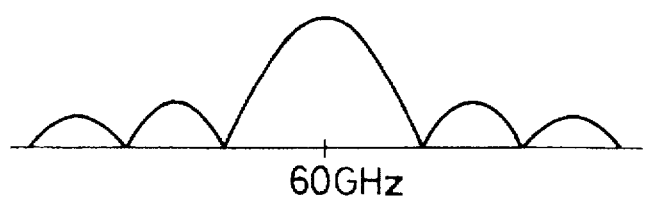
FIGS. 3A-3F is a wave-form diagram showing a spectrum of an output of each part shown in FIG. 2.
Figure 10:
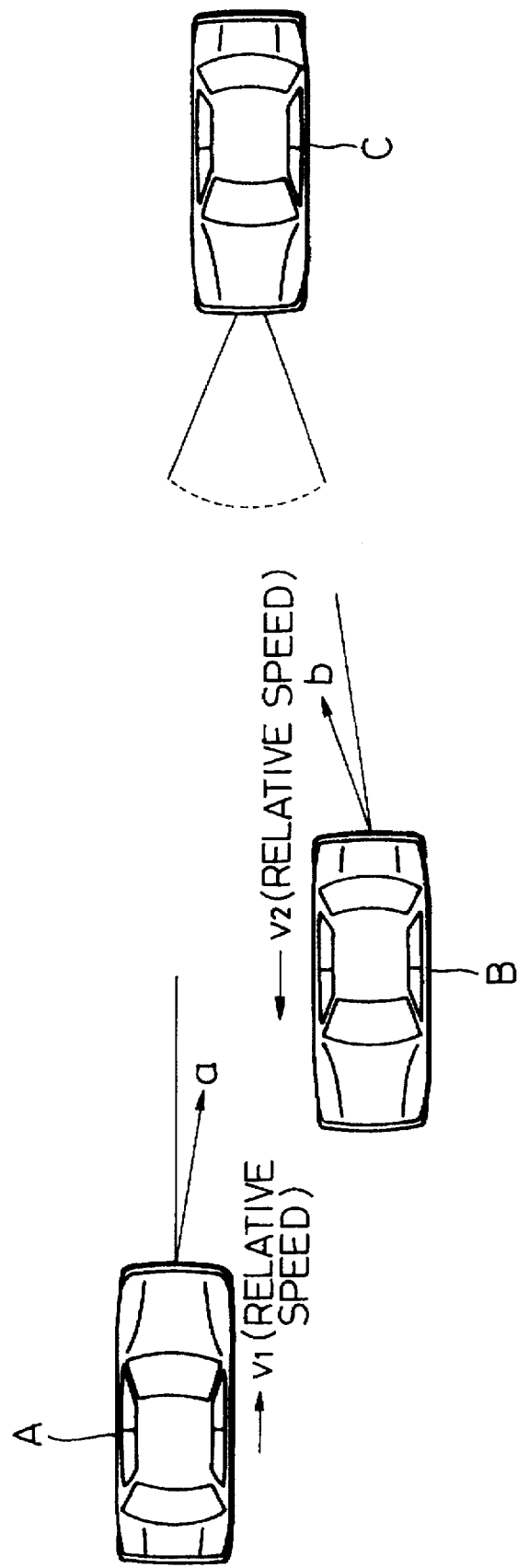
FIG. 10 is a model view for explaining action of a conventional radar device mounted on an automobile.

The received signal received by the receiving antenna 16 makes, in the case of two reflected waves "a" and "b" in FIG. 10, for example, a spectrum in which the reflected waves "b" and "b" are synthesized with spectrums of PN codes for transmitting appearing on both sides around 60 GHz (See FIG. 3A). In the following explanation, the spectrum in the case of the reflected waves "a" and "b" in FIG. 10 will be shown in FIG. 3. The spectrum in FIG. 3 is shown with frequency in the horizontal direction and power in the vertical direction.

Figure 2:
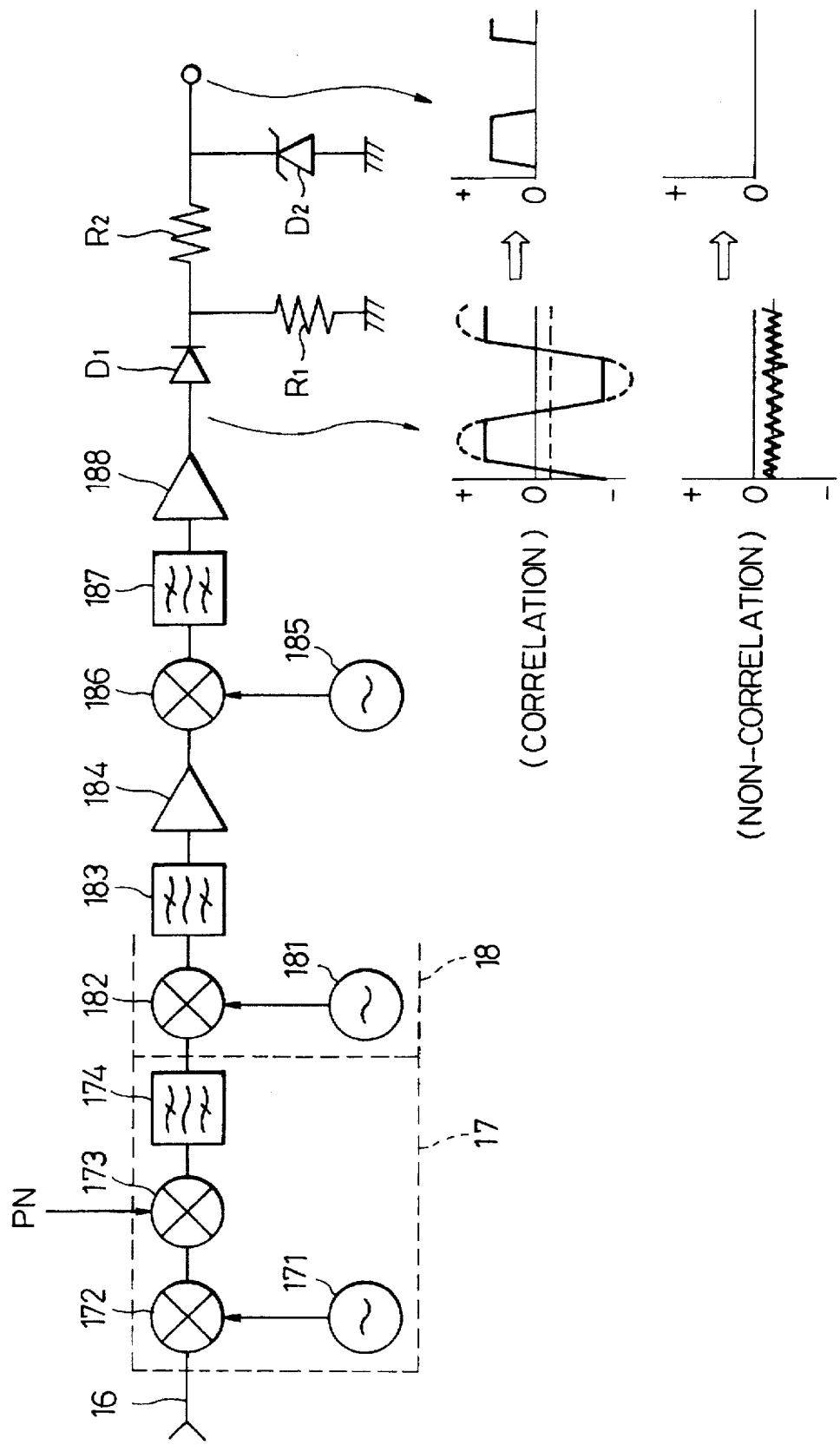
FIG. 2 is a circuit diagram showing constitution of a receiving part and a down converter shown in FIG. 1.

The receiving part 17 receives the reflected wave from the object 10 though the receiving antenna 16 and despreads it. This receiving part 17 comprises, as shown in FIG. 2, an oscillator 171, a mixing circuit 172 connected to the oscillator 171 (hereinafter referred to as "mixer"), a mixer 173 connected to the delay circuit 15 and the mixer 172 and a filter 174 connected to the mixer 173.

The oscillator 171 generates a signal of a prescribed frequency (frequency of the 59 GHz band, for example).

Figure 3B:
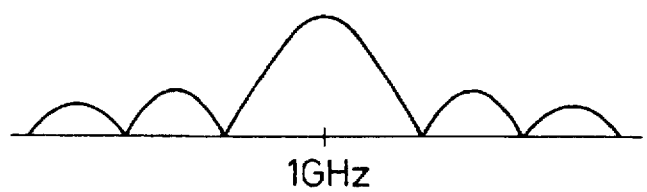

The mixer 172 mixes the received signal of the 60 GHz band from the receiving antenna 16 (See FIG. 3A) with the signal of the 59 GHz band from the oscillator 171 and puts out a signal of the intermediate frequency of the 1 GHz band, which is easy to be handled (See FIG. 3B).

Also, the mixer 173 mixes the spread signal of the 1 GHz band from this mixer 172 with the PN code from the delay circuit 15 and despreads it. In the case of the above mentioned reflected waves "a" and "b", when correlation is made here, the mixer 173 puts out a synthetic signal of a signal with a sharp peak rising in the intermediate frequency of 1 GHz and a signal which is not correlated but left spread without a sharp peak.

Figure 3C:
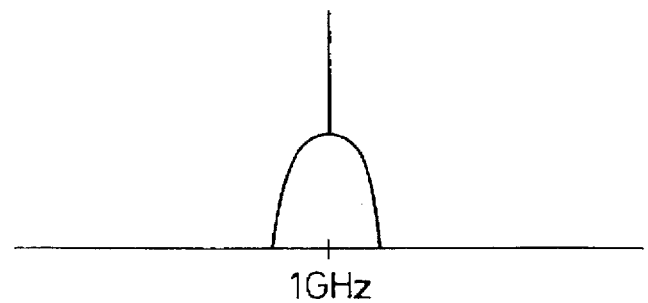

The filter 174 is to pass only a signal component of a prescribed narrow-band of the signal components from the mixer 173 and passes only the signal component of this 1GHz band and puts it out to the down converter 18 in this preferred embodiment (See FIG. 3C).

The down converter 18 converts the received signal of the intermediate frequency band put in from the receiving part 17 into a low frequency by a plurality of mixers (mentioned later) in several stages to down-convert this received signal. The down converter 18 in this preferred embodiment comprises an oscillator 181, a first stage mixer 182 connected to the filter 174 and the oscillator 181, a filter 183 connected to the mixer 182, an amplifier 184 connected to the filter 183, an oscillator 185, a second stage mixer 186 connected to the amplifier 184 and the oscillator 185, a filter 187 connected to the mixer 186, an amplifier 188 connected to the filter 187 and diodes D1, D2 and resistances R1 and R2 for carrying out waveform shaping of a signal from the amplifier 188.

The oscillator 181 generates a signal of a prescribed frequency (frequency of the 0.93 GHz band, for example).

The first stage mixer 182 mixes the signal of the 1 GHz band from the receiving part 17 with a signal of the 0.93 GHz from the oscillator 181 and puts out a synthetic signal of a low frequency of the 70 MHz band to the filter 183.

The filter 183 passes only the signal component of a prescribed narrow-band of the signal components from the mixer 182. That is, this filter 183 comprises a band pass filter (BPF) and passes only the signal component of the 70 MHz band of the beat signal components put in from the mixer 182 and puts it out to the amplifier 184.

Figure 3D:
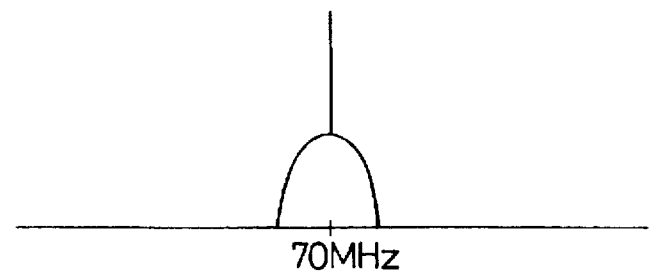

The amplifier 184 amplifies the signal put in from the filter 183 into the signal of the spectrum shown in FIG. 3D and puts it out to the mixer 186.

The oscillator 185 generates a signal of a prescribed frequency (frequency of the 70.025 MHz band, for example). This oscillator 185 generates a signal of 70.025 MHz, that is 70 MHz +25 KHz, and puts it out to the mixer 186. This oscillator 185 can be constituted so that it puts out a frequency of 70 MHz−25 KHz=69.975 MHz.

Figure 3E:
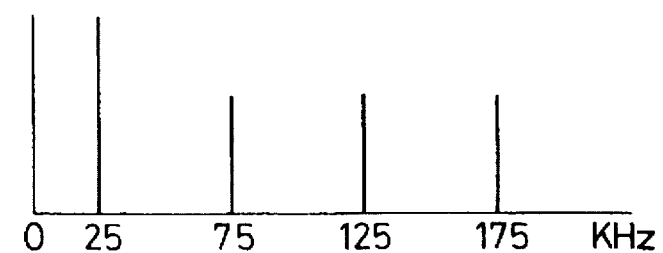

The mixer 186 mixes the signal of 70 MHz band from the amplifier 184 with the frequency signal of 70.025 MHz from the oscillator 185 and puts out a low-frequency signal of the 25 KHz band to the filter 187 (See FIG. 3E). In this case, the put-out frequency is Doppler-shifted in the direction lower than the center frequency against the approaching object. Also, when the signal put out of the oscillator 185 has a frequency of 69.975 MHz band, the put-out frequency is Doppler-shifted in the direction higher than the center frequency against the approaching object.

Thus, in this preferred embodiment, the frequency of the signal put out of the oscillator 185 can be chosen depending on whether the approaching object should be detected accurately or rapidly. That is, when the frequency from the oscillator 185 is set at 70.025 MHz, the put-out frequency gets lower than the center frequency and one period becomes longer. By this, a count value at the processing part is increased, and detection accuracy of a relative speed is improved. Also, when the frequency from the oscillator 185 is set at 69.675 MHz, the put-out frequency gets higher than the center frequency and one period becomes shorter. By this, the object can be detected more rapidly.

In this preferred embodiment, supposing a relative speed of ±200 Km/h for a carrier with a frequency f0 of 60 GHz, there is a Doppler shift of ±22 KHz and the center frequency shall be set at 25 KHz and the Doppler shift range at 47 to 3 KHz.

Figure 3F:

The filter 187 comprises, for example, BPF or a low pass filter (LPF) which passes only the signal component of the narrow band of 25 KHz band of the signal components put in from the mixer 186 and puts it out to the amplifier 188. By this, as for the signal component of the frequency band other than the 25 KHz band, the level of the spectrum is lowered as shown in FIG. 3F and put out to the amplifier 188. These FIGS. 3E and 3F are diagrams enlarging the neighborhood of 25 KHz showing the frequency component of the signal with power concentrated (25 KHz) and a part of the frequency components of the signals which are left spread.

Also, in this preferred embodiment, as shown in FIG. 4A, the reflected wave from a certain object is despread. And the frequency component $f\alpha$ which is correlated and power-concentrated may approach, overlap or pass spectrums $f\beta$, $f\gamma$, $f\delta$ and any other spectrums of the reflected waves which are left spread in the wide band from another object due to frequency shift by the Doppler effect. In such a case, the spectrums $f\beta$, $f\gamma$, $f\delta$ and any other spectrums constitute a noise component for the frequency $f\alpha$.

That is, referring to FIG. 4A, when there is a relative speed in the above mentioned certain object, the frequency of the frequency component $f\alpha$ is shifted due to the Doppler effect. Here, $\Delta f1$ is a shift range due to the Doppler effect of the reflected wave from the certain object. Also, when there is a relative speed in another object, the spectrums $f\beta$, $f\gamma$, $f\delta$ and all the other spectrums which are left spread in the wide band are shifted due to the Doppler effect. $\Delta f2$ is a shift range due to the Doppler effect of the reflected wave from another object. Strictly speaking, a Doppler-shift amount of each of the spectrums spread in the wide band is different from each other but can be considered as almost the same value.

When these objects have different relative speeds, in order that $f\alpha$ does not overlap $f\beta$, as can be seen from FIG. 4A, a repetitive frequency fe of a PN code row should be sufficiently larger than $\Delta f1+\Delta f2$. That is, $fe > 2 \cdot \Delta f$ and $\Delta f =$ (Doppler shift range due to relative speed in a measurement range of the frequency f0 of the carrier)/2 should be satisfied.

If this condition is met, when this synthetic signal is passed through the filter of the band of $\pm \Delta f1$ around $f\alpha$ at the time when the relative speed is 0, only $f\alpha$ passes, and detection performance is not restricted by reflected waves from other objects.

This condition is satisfied when the center frequency after down conversion is higher than the band of the spread signal.

Also, in realizing the circuit constitution of the present invention, down conversion is carried out to a low frequency to be countable at a logic circuit. Thus, a frequency after down conversion might be lower than the band of the spread signal. In this case, as shown in FIG. 4B, the spectrum of the component with the frequency lower than the center of the spread signal returns from DC (0 Hz) and overlaps the spectrum of the component with high frequency. Then, the condition stricter than this should be satisfied.

That is, even if the spectrum of the component of the spread signal appearing adjacent to $f\alpha$, that is, $f\gamma$ and $f\delta$, for example, is shifted toward $f\alpha$ by a Doppler-shift amount $\Delta f3$, it is necessary that these $f\gamma$ and $f\delta$ should be sufficiently away from the Doppler shift range $\Delta f1$ of $f\alpha$. That is, $f\alpha + \Delta f1 < f\delta - \Delta f3$ $f\alpha - \Delta f1 > f\gamma + \Delta f3$ Also, when it is so set that there is no frequency component lower than $f\alpha$ as in FIG. 3E, it is necessary that $f\alpha$ should not reach the DC level even if it is Doppler-shifted in the lower direction.

In this preferred embodiment, to satisfy this condition, such codes are used that the chip duration is about 40 ns and duration of one period is 255 chips (10 μs). And it is so set that the frequency components of the signal spread as in FIGS. 3E and 3F appear at 75 KHz, 125 KHz, 175 KHz . . .

Even if the frequency component of 25 KHz is Doppler-shifted by +22 KHz to 47 KHz and the frequency component of 75 KHz is Doppler-shifted by —22 KHz to 53 KHz, these frequency components will not overlap each other. Thus when the frequency component above 50 KHz is damped by the low pass filter, only necessary components (frequency component of 25 KHz) can be taken out.

In this case, there is some sneak noise, etc. of the generated frequency component of the oscillator 181 to the mixer 186. Such noise is put into the processing part 11 at the same time with the signal which is correlated and power-concentrated, and there is a possibility that misjudgment occurs at the processing part.

Then, at the amplifier 188, where put-in signals are amplified, when its output is set around 0 V, for example, a sneak noise will be generated at the output if a gain of the signal is large. In this preferred embodiment, the center of this output is set at the level lower than 0 V. Thus, when correlated at the receiving part 17, the amplifier 188 puts out a pulse containing positive and negative components to the diode D1 as shown in FIG. 2. Also, when not correlated, the amplifier 188 puts out a noise with negative component to the diode D1.

The diode D1 eliminates the negative component of the put-in signal. The Zener diode D2 eliminates the positive component of this signal above 5 V, for example, carries out waveform shaping and when correlated, puts out a pulse signal from 0 to 5 V to the processing part 11. Also, when not correlated, this pulse signal will not be put out from the diode D1.

The processing part 11 recognizes correlation by input of the pulse signal from the down converter 18 and detects presence of the object. When the delay time is shifted and correlation begins to be made, this pulse signal is disturbed, repeating being put out and disappearing. Thus, the processing part 11 judges correlation by measuring the pulse signal during several periods to confirm stable counting.

Also, the processing part 11 controls output of the PN code by the delay circuit 15 to be delayed for a prescribed period of time so that the received signal is correlated with the PN code. The processing part 11 in this preferred embodiment sets the delay time somewhat rough at the beginning of the control. And when the received signal begins to be correlated with the PN code as shown in FIGS. 5A and 5B, that is, the pulse signal from the down converter 18 begins to rise, the processing part 11 controls the delay circuit 15 by setting the delay time closely.

Also, the processing part 11 measures the distance to the object which is correlated. As a method for measuring the distance, the beginning of correlation between the received signal and the PN code and the end of correlation as shown in FIGS. 5B and 5C, that is, the delay time in the middle of the beginning of the rise and the beginning of disappearing of the pulse signal from the down converter 18 (middle point of the range where correlation is made shown in FIG. 5D) is taken as distance information. And the processing part 11 measures the distance to the object according to this distance information.

Also, the range of correlated delay time is shorter than or equal to the time of one chip duration of the PN code. Thus, in the present invention, the distance can be also calculated based on the corrected time with a half chip duration from the beginning of correlation (or the end).

Moreover, the processing part 11 detects the relative speed to the correlated object. In this preferred embodiment, the received signal is not returned to the base band but converted at the down converter 18 to a frequency which is easy to be counted by a digital counter or the like in the processing part 11. And the processing part 11 counts the period of the signal (pulse signal into which the received signal was given waveform shaping) to acquire the relative speed. In this detection of the relative speed, the processing part 11 can acquire the moving direction and the relative speed of the object by acquiring in which direction and how much the period is shifted from the center frequency (25 KHz in this preferred embodiment). That is, in this preferred embodiment, the moving direction and the relative speed of the object are detected by acquiring the Doppler-shift amount and the Doppler-shift direction of the measured frequency against the set center frequency.

In an actual circuit, if a signal put into a processing part for measuring a period is not down-converted accurately, a relative speed by period measurement can not be detected. However, in effect, deviation of a generated frequency, temperature characteristics, chronological changes, etc. will cause an error in the down converter. Then, it necessitates a means for automatically correcting this error, but this can be carried out easily by the following method in this preferred embodiment.

For example, a difference in frequency between the oscillators of 70 MHz and 70.025 MHz determines the frequency when put into the processing part. Therefore, there is provided in an actual circuit a generating means for mixing these two frequencies and for generating its difference and a period measuring means for measuring the period of the frequency of the difference. This period measuring means can be easily devised by using a part of a means provided originally for detecting signals.

This difference signal is the center frequency of an original signal, that is, the frequency when the relative speed is 0, and when this is put into the processing part, correction can be easily executed by operation. Of course, it can be so controlled that the difference of the frequencies is kept constant by making either one of the oscillators frequency-variable.

In this preferred embodiment, the received signal spread in the wide band is not converted to the base band but down-converted to the low-frequency band, which is easy to be measured, so that a signal is generated when correlation is made, and this signal is given waveform shaping to generate a pulse signal. Thus, in this preferred embodiment, the distance to the object can be measured from this correlated delay time, and the relative speed of the object can be measured from the period of this pulse signal at the same time. Therefore, in this preferred embodiment, the measurement time can be reduced.

Also, in this preferred embodiment, even if a plurality of reflected waves are received, only the signal with power concentrated is taken out of the correlated object by the narrow band filter and the signal can be detected. Thus, in this preferred embodiment, deterioration in detection performance or restriction due to the signal (noise) in the noncorrelated and spread state is reduced.

Also, in this preferred embodiment, according to the setting method of the frequency to be mixed with the received signal at the mixer, there is the above mentioned relationship between the moving direction of the object and a shift amount of the converted frequency. Thus, in this preferred embodiment, the moving direction of the object can be easily recognized by the shift amount of the frequency together with the relative speed.

Also, in this preferred embodiment, circuits can be constituted without using expensive instruments as integrators or A/D converters, and a manufacturing cost can be reduced.

As mentioned above, in this preferred embodiment, the distance to the object and the relative speed can be measured at the same time with a common circuit, and measurement time and the number of parts can be reduced, size and cost of the device can be decreased and a measuring accuracy can be improved.

In this preferred embodiment, the received signal is despread and then, down-converted. However, the present invention is not limited to this but can be so constituted that the received signal is converted to a low-frequency signal and then, despread.

Also, the delay circuit in this preferred embodiment shifts the range of a corresponding delay time of the distance set in advance in detecting correlation. However, the present invention is not limited to this, but the corresponding delay time of the distance set in advance can be fixed, for example, and in this case, an object in a specified distance can be detected Also, the above mentioned code setting condition of the PN code and the setting condition of the passing band of the narrow band filter are not limited to the radar device of the constitution shown in this preferred embodiment. For example, these setting conditions can be used for a radar device which detects presence of an object and measures speed or distance to the object by transmitting a wave whose band is spread by a PN signal, receiving a reflected wave from the object based on the wave, detecting correlation between the received signal and the PN signal and converting the correlated signal to a base band. In this case, too, as with the above mentioned preferred embodiment, even if a plurality of reflected waves are received, only a signal with power concentrated can be taken out by the narrow band filter to detect the signal. Thus, in this case, detection performance will not be deteriorated or restricted.

In this preferred embodiment, a general band pass filter or a low pass filter is supposed as the narrow band filter, and when some noise is mixed in the pass band of this filter, measurement might be mistaken.

Figure 6:
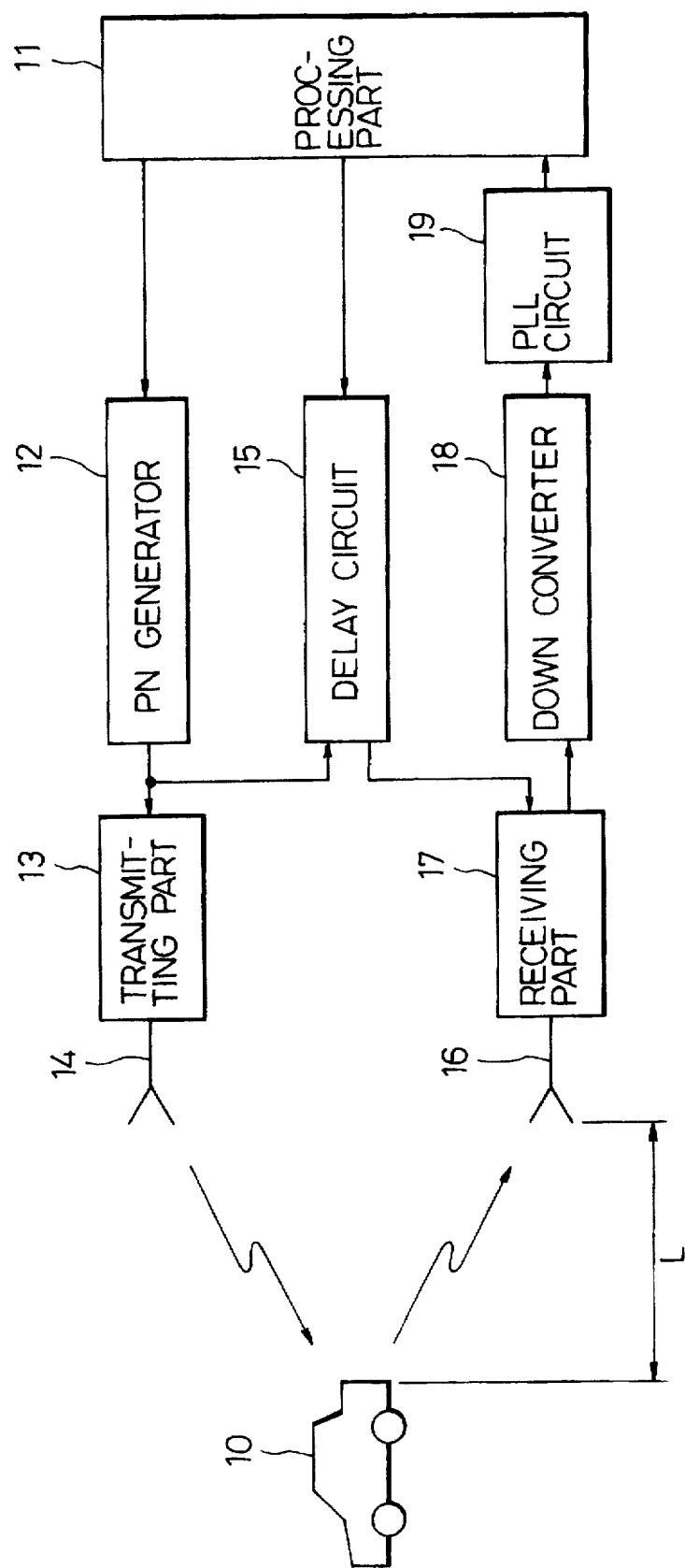
FIG. 6 is a block diagram showing schematic constitution of another preferred embodiment of a radar device according to the present invention.

Then, the present invention provides another preferred embodiment of a radar device as shown in FIG. 6. Referring to FIG. 6, a radar device in this preferred embodiment is provided with, as with the device in FIG. 1, the processing part 11, the PN generator 12, the transmitting part 13, the transmitting antenna 14, the delay circuit 15, the receiving antenna 16, the receiving part 17 and the own converter 18 and other than those, still provided with a PLL circuit 19 acting as a narrow band filter.

Figure 7:
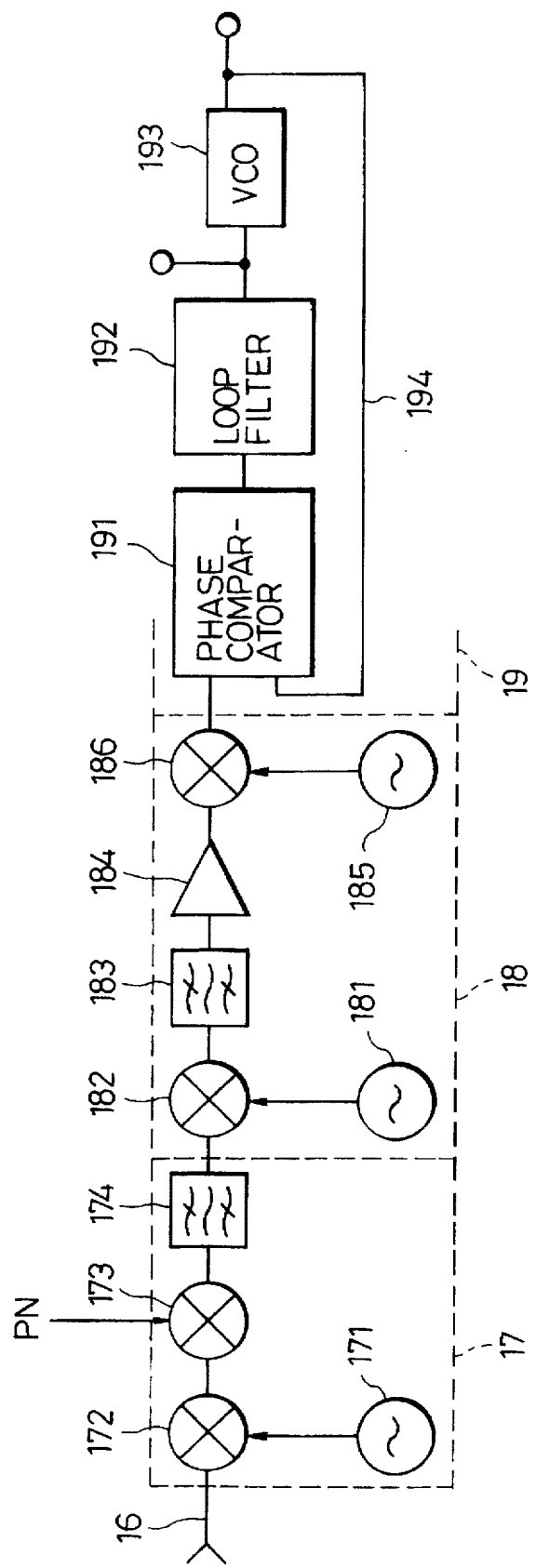
FIG. 7 is a circuit diagram showing constitution of a receiving part, down converter and a PLL circuit shown in FIG. 6.

Functions of the processing part 11, the PN generator 12, the transmitting part 13, the transmitting antenna 14, the delay circuit 15, the receiving antenna 16 and the receiving part 17 shown in FIG. 6 are the same as those in FIG. 1 and their explanation will be omitted. The down converter 18 is constituted by the oscillators 181 and 185, the mixers 182 and 186, the filter 183 and the amplifier 184 as shown in FIG. 7, and puts out a low-frequency signal of the 25 KHz band shown in FIG. 3E to the PLL circuit 19. In this case, too, as with the above mentioned preferred embodiment, the put-out frequency is Doppler-shifted in the direction lower than the center frequency against the approaching object. Also, when the signal put out of the oscillator 185 is the frequency of the 69.975 MHz band, the put-out frequency is Doppler-shifted in the direction higher than the center frequency against the approaching object.

Thus, in this preferred embodiment, the frequency of the signal put out of the oscillator 185 can be chosen depending on whether the approaching object should be detected accurately or rapidly. Also, in this preferred embodiment, too, when the relative speed of ±200 Km/h is supposed for the carrier with the frequency f0 of 69 GHz, there is a Doppler shift of ±22 KHz, and the center frequency is set at 25 KHz and the Doppler shift range at 47 KHz to 3 KHZ.

The PLL circuit 19 is, as shown in FIG. 7, constituted by a phase comparator 191, a loop filter 192 connected to the phase comparator 191, a VCO 193 connected to the loop filter 192 and a feedback loop 194, and set to be locked only for a signal component of the narrow band from 3 KHz to 47 KHz of the put-in signal components.

The phase comparator 191 compares the signal component put in from the mixer 186 of the down converter 18 with the signal component fed back from the VCO 193 and puts out the error. The loop filter 192 passes the signal component of the narrow band of the outputs from the phase comparator 191. The VCO 193 puts out the signal component synchronized with the signal component put in from the loop filter 192 and feeds it back to the phase comparator 191 through the feedback loop 194.

In this preferred embodiment, too, when the center frequency after down conversion is higher than the band of the spread signal, as can be seen from FIG. 4A, fe>2·Δf and Δf=(Doppler-shift range due to relative speed in the measurement range of the frequency f0 of the carrier)/2 should be satisfied. And this synthetic signal is passed through the filter of the band of ±Δf1 around fΔ at the time when the relative speed is 0 so that only f is passed. By this, in this preferred embodiment, there is no restriction on detection performance by the reflected waves from other objects.

Also, when the frequency after down conversion is lower than the band of the spread signal, as shown in FIG. 4B, the spectrum of the component with the frequency lower than the center of the spread signal comes back from DC (0 Hz) and overlaps the spectrum of the component with high frequency. Thus, in this preferred embodiment, the condition of fα+Δf1<fδ−Δf3, fα−Δf1>fγ+Δf3 should be met.

Also, as in FIG. 3E, when it is so set that there in no frequency component lower than fα, DC level is not reached even with the Doppler shift in the direction of lower fα.

In this preferred embodiment, too, in order to satisfy the above, a code of the chip duration of about 40 ns and duration of one period of 255 chips (10 μ S) is used and set, as in FIG. 3E, so that the frequency components of the spread signal appear at 75 KHz, 125 KHz, 175 KHz . . . .

Even when the frequency component of 25 KHz is Doppler-shifted by +22 KHz to 47 KHz and the frequency component of 75 KHz is Doppler-shifted by −22 KHz to 53 KHz, it is set so that these frequency components do not overlap each other. And the signal component from the down converter 18 is put into the PLL circuit 19 having a lock-in range or lock range of 3 KHz to 47 KHz. By this, in this preferred embodiment, an output of the PLL circuit 19 based on the required frequency component, that is, the frequency of the output signal of the VCO 193 or the output voltage of the loop filter 192 can be taken out.

The processing part 11 recognizes correlation by the fact that the PLL circuit 19 has been brought into the locked state and detects presence of the object. When the delay time is shifted and correlation begins to be made, the PLL circuit 19 repeats the locked state and unlocked state. By this, the processing part 11 judges correlation to be made by confirming continuation of the locked state of the PLL circuit for a prescribed period of time.

Also, the processing part 11 controls output of the PN code by the delay circuit 15 to be delayed for a prescribed period of time so that the received signal is correlated with the PN code. The processing part 11 in this preferred embodiment sets the delay time somewhat rough at the beginning of control. And the processing part 11 controls the delay circuit 15 by closely setting the delay time when the input signal begins to be correlated with the PN code as shown in FIGS. 5A and 5B, that is, when the pulse signal from the down converter 18 begins to rise.

Also, the processing part 11 measures the distance to the correlated object. As a method for measuring distance, the delay time in the middle from the beginning of correlation between the received signal and the PN code to the end of correlation shown in FIGS. 5B and 5C, that is, between the beginning and the end of the locked state of the PLL circuit 19 (middle point of the range where correlation is made shown in FIG. 5D) is made as distance information. And the processing part 11 measures the distance to the object based on this distance information.

Also, as the range of delay time where correlation is made is shorter than or equal to the time for one chip duration of the PN code, there is another method of calculating the distance based on the corrected time, for example, with a half chip duration from the beginning (or the end) of correlation.

Moreover, the processing part 11 detects relative speed to the correlated object. In this preferred embodiment, the received signal is not returned to the base but converted to a low frequency at the down converter 18 and the converted signal is put into the PLL circuit 19. In this preferred embodiment, the period of the output of the VCO 193 when the PLL circuit 19 becomes locked is counted at the processing part 11, or the output voltage of the loop filter 192 is A/D converted at the processing part 11 to acquire the relative speed. In this detection of the relative speed, the processing part 11 can acquire the moving direction and the relative speed of the object by acquiring in which direction and how much the period or the voltage is shifted from the period or the voltage corresponding to the center frequency (25 KHz in this preferred embodiment). That is, in this preferred embodiment, the moving direction and the relative speed of the object are detected by acquiring the Doppler-shift amount and the Doppler-shift direction of the measured frequency against the set center frequency.

In an actual circuit, if the signal put into a processing part for measuring a period or voltage is not based on those which are accurately down-converted, relative speed can not be detected based on the period or voltage measurement. However, in effect, deviation of oscillated frequency, temperature characteristics, chronological changes, etc. will cause an error at the down converter. Then, it necessitates a means for automatically correcting this error, but it can be carried out easily by the following method in this preferred embodiment.

For example, a difference in frequencies between the oscillators of 70 MHz and 70.025 MHz determines the frequency when put into the processing part. Therefore, there is provided in this preferred embodiment a generating means for mixing these two frequencies and for generating its difference and a period measuring means for measuring the period of the frequency of the difference. This period measuring means can be easily devised by using a part of a means provided originally for detecting signals.

This difference signal is the center frequency of an original signal, that is, the frequency when the relative speed is 0, and when this is put into the processing part, correction can be easily executed by operation. Of course, it can be so controlled that the difference of the frequencies is kept constant by making either one of the oscillators frequency-variable.

In this preferred embodiment, the received signal spread in the wide band is not converted to a base band but down-converted to a low-frequency band, which is easy to be measured, so that the PLL circuit 19 is locked and the signal of the VCO 193 or the loop filter 192 can be taken out when correlation is made. Therefore, in this preferred embodiment, the distance to the object can be measured from this correlated delay time, and the relative speed of the object can be measured from the period or the voltage of the output signal of the PLL circuit 19 at the same time. By this, in this preferred embodiment, measurement time can be reduced.

Figure 8:
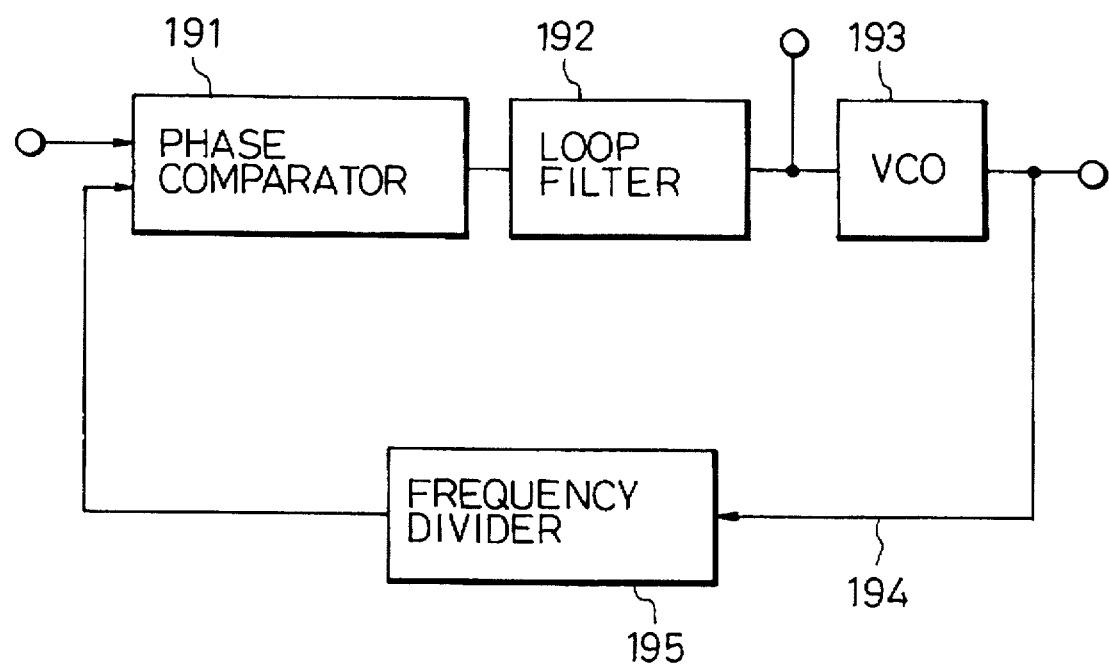
FIG. 8 is a block diagram showing constitution of the PLL circuit of another preferred embodiment.

Also, in the relative speed measurement of the present invention, as shown in FIG. 8, a frequency divider 195 can be inserted into the feedback loop 194 from the VCO 193 to the phase comparator 191. By this, in this preferred embodiment, as the output change of the VCO 193 and the loop filter 192 gets greater for the change in input, measurement accuracy can be improved.

Also, in this preferred embodiment, even if a plurality of reflected waves are received, the PLL circuit is locked only for the signal with power concentrated from the correlated object, and the output signal of the PLL circuit based on that signal can be detected. Therefore, in this preferred embodiment, deterioration or restriction on detection performance due to a signal in the non-correlated and spread state (noise) is reduced.

Also, the PLL circuit of this preferred embodiment has a characteristic that, if there exist signals of different frequencies in the lock range, it is locked for those with larger power. Thus, in the PLL circuit, signals can be detected stably even if a noise with the power smaller than the required signal is mixed in the lock range.

Also, in this preferred embodiment, a circuit can be constituted by a general-purpose exclusive IC constituting the PLL circuit without using expensive instruments such as integrator, A/D converter, etc., and the manufacturing cost can be reduced.

In this way, with this preferred embodiment, the distance and the relative speed of the object can be measured with a common circuit at the same time to reduce measurement time and the number of parts and to reduce the size and the cost of the device as well as to improve measurement accuracy and moreover, to reduce mixing of a noise in the pass band to improve noise resistance.

Also, as the PLL circuit of this preferred embodiment has a phase comparator, a loop filter, a VCO and a feedback loop from the VCO to the phase comparator, the processing part can easily detect presence of an object and measure speed or the distance to the object based on the output from the loop filter or the VCO.

Also, with the PLL circuit of this preferred embodiment, the lock-in range or lock range is set in the frequency shift range where such a signal is supposed that is correlated at the receiving part, has power concentrated and is frequency-converted at the down converter. Also, with this PLL circuit, the lock-in range or lock range is set so that it does not overlap the frequency shift range where such a spectrum is supposed that is not correlated at the receiving part but left spread and is frequency-converted at the down converter. Therefore, in this preferred embodiment, even if a plurality of reflected waves are received, only the frequency component with power concentrated can be taken out.

In this preferred embodiment, the processing part 11 measures the relative speed of the object by measuring the time of one period of an input signal, and the detection accuracy and detection time are varied according to the relative speed of the object. That is, when the frequency from the oscillator 185 is set at 70.025 MHz, the period of the signal put into the processing part 11 gets longer for the approaching object. Thus, in this preferred embodiment, though the detection time is prolonged, a count value at the processing part 11 is increased and detection accuracy (resolution) gets higher. In the meantime, a period of the input signal gets shorter for the object which is going away. Therefore, in this preferred embodiment, though the detection time is shortened, detection accuracy (resolution) gets lower. When detection time and detection accuracy (resolution) are varied according to the period of the detected signal in this way, there might be some inconvenience depending on the application of the radar device.

Then, another preferred embodiment of the radar device according to the present invention to solve the above point will be explained as follows. The radar device of this preferred embodiment is, as with the device in FIG. 6, provided with the processing part 11, the PN generator 12, the transmitting part 13, the transmitting antenna 14, the delay circuit 15, the receiving antenna 16, the receiving part 17, the down converter 18 and the PLL circuit 19.

Figure 9:
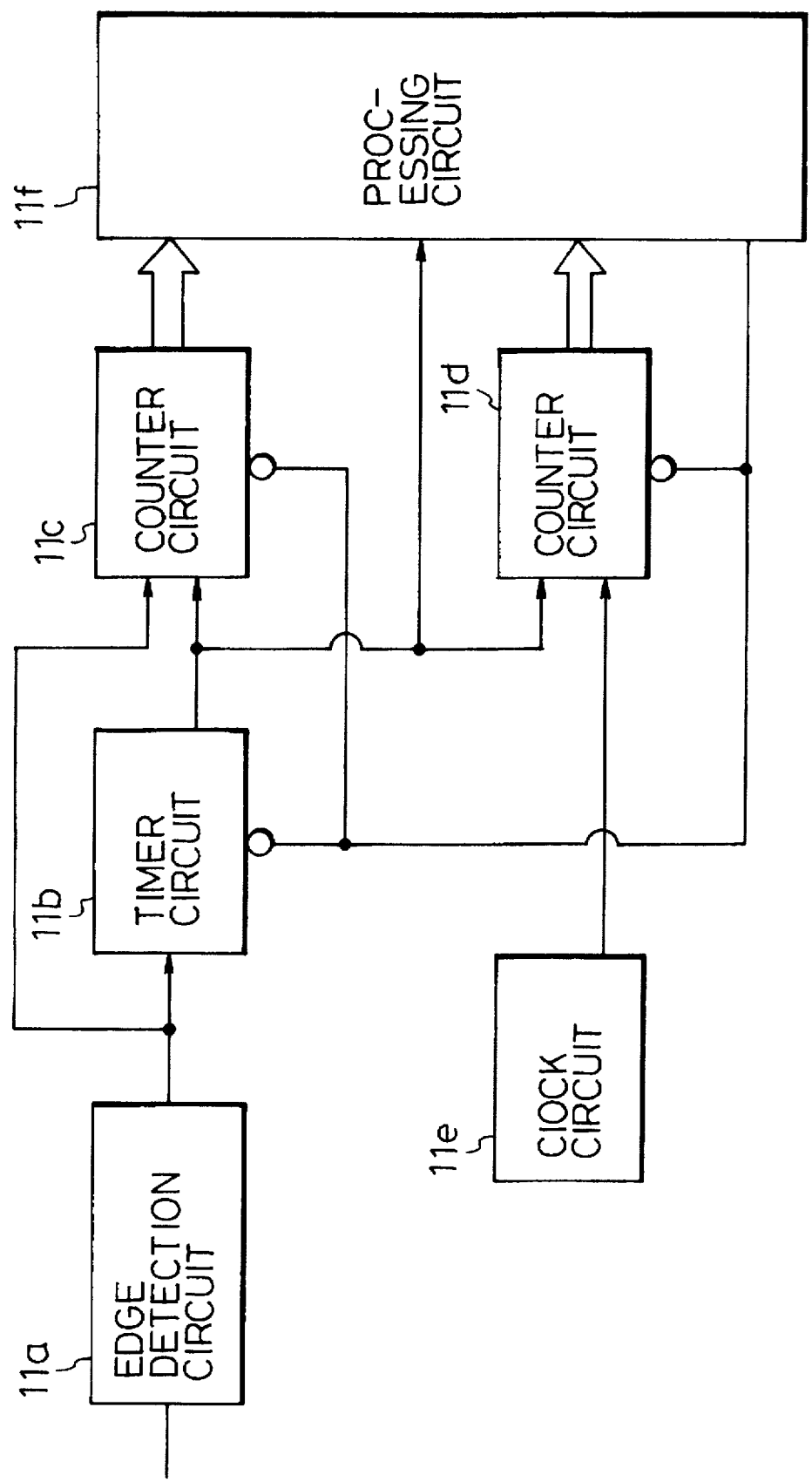
FIG. 9 is a block diagram showing constitution of the processing part of another preferred embodiment shown in FIG. 6.

Functions of the PN generator 12, the transmitting part 13, the transmitting antenna 14, the delay circuit 15, the receiving antenna 16, the receiving part 17, the down converter 18 and the PLL circuit 19 are the same as each in FIG. 6, and the explanation will be omitted. Referring to FIG. 9, the processing part 11 comprises an edge detection circuit 11a, a timer circuit 11b, counter circuits 11c and 11d, a clock circuit 11e for putting out a clock signal and a processing circuit 11f and calculates the duration of one period.

The edge detection circuit 11a is connected to the PLL circuit 19 and detects an edge of the input signal from the PLL circuit 19. And the edge detection circuit 11a puts out a pulse signal to the timer circuit 11b and the counter circuit 11c when it detects this edge. The direction of the edge detected by the edge detection circuit 11a can be either of rising or trailing. Also, it is not impossible for the edge detection circuit 11a to function to detect both the edges, but a pulse is put out every half period of the input signal, based on which measurement is made. Thus, the duty ratio of the input signal should be exactly 50% at the edge detection circuit 11a, and the detection of both the edges is not appropriate.

The timer circuit 11b is connected to the edge detection circuit 11a and the processing circuit 11f and receives a pulse signal from the edge detection circuit 11a and a reset signal from the processing circuit 11f.

And while this reset signal remains effective (low level in this embodiment), the timer circuit 11b is brought into the reset state, and its output is also fixed in the inactive state (low level in this embodiment). Also, when a pulse signal is put in once from the edge detection circuit 11a after this reset signal becomes ineffective (high level in this embodiment), the output of the timer circuit 11b is brought into the active state (high level in this embodiment) and starts time measurement. The output of the timer circuit 11b is put into the counter circuits 11c and 11d as a signal to instruct a counting action. And the timer circuit 11b returns the output into the inactive state when a pulse signal is put in from the edge detection circuit 11a after a prescribed period of time which was set in advance has elapsed. This prescribed period of time is set as a time not too long but sufficient for measuring the minimum frequency of the input signal, which is 3 KHz in the above embodiment, ⅓ KHz= 333 μs, for example.

The counter circuit 11c is connected to the edge detection circuit 11a, the timer circuit 11b and the processing circuit 11f and receives output signals from the edge detection circuit 11a and the timer circuit 11b and a reset signal from the processing circuit 11f. The counter circuit 11d is connected to the timer circuit 11b, the processing circuit 11f and the clock circuit 11e and receives an output signal from the timer circuit 11b and reset signals from the processing circuit 11f and the clock circuit 11e.

In both the counter circuits 11c and 11d, counts are cleared while the reset signal remains effective, and their outputs are fixed in the state showing "0". Also, when the reset signal is made ineffective and the output of the timer circuit 11b becomes active, that is, when a pulse signal is put in once from the edge detection circuit 11a, the counter circuit 11c starts counting of the pulse signal from the edge detection circuit 11a, and the counter circuit 11d starts counting of the clock signal from the clock circuit 11e.

After that, when the output of the timer circuit 11b becomes inactive, that is, when a pulse signal is put in again from the edge detection circuit 11a after a prescribed period of time has elapsed, both the counter circuits 11c and 11d stop counting, hold the count values so far and put out the count values to the processing circuit 11f.

The processing circuit 11f is connected to the timer circuit 11b and the counter circuits 11c and 11d. This processing circuit 11f receives the output signal from the timer circuit 11b and the count values from the counter circuits 11c and 11d and puts out a reset signal to the timer circuit 11b and the counter circuits 11c and 11d.

The processing circuit 11f monitors the output signal from the timer circuit 11b. In the processing circuit 11f, after the reset signal to the timer circuit 11b and the counter circuits 11c and 11d become inactive, the output signal to the timer circuit 11b becomes active. When it is brought back to the inactive state after that, the processing circuit 11f takes in the count value of the edge detection pulse from the counter circuit 11c and the count value of the clock signal from the counter circuit 11d, respectively. And the processing circuit 11f divides the count value of the clock signal by the count value of the edge detection pulse to calculate the duration of one period.

Next, the processing circuit 11f acquires in which direction and how much the duration of this one period is shifted from the center frequency and acquires the moving direction and the relative speed.

Thus, in this preferred embodiment, the duration of one period and plural periods of a frequency-converted signal in a prescribed period of time is counted to acquire the duration of one period from the number of the periods and the count value. Therefore, in this preferred embodiment, the number of periods to be counted can be made variable according to the period of this converted signal, and detection accuracy (resolution) and detection time in a certain range can be obtained regardless of the period of the input signal.

What is claimed is:

1. A spread spectrum radar device which receives a reflected wave from an object based on a transmitted wave and detects said object, comprising:

generating means for generating a pseudorandom noise signal;

a transmitter for transmitting a wave whose band is spread by said pseudorandom noise signal;

a receiver for receiving a reflected wave from the object based on said transmitted wave and putting out a received signal;

despreading means for despreading said received signal by said pseudorandom noise signal and detecting a correlation of said received signal with said pseudorandom. noise signal;

a delay device for delaying said pseudorandom noise signal for a prescribed delay time when said correlation is detected;

a distance measuring device for measuring a distance to said object according to said delay time when said correlation is detected;

a frequency converter for converting the frequency of said received signal to a signal with a low frequency; and identifying means for identifying presence of said object based on said frequency-converted low frequency signal.

2. spread spectrum radar device according to claim 1, wherein said delay device shifts a range of a corresponding delay time of a distance which is set in advance in detecting said correlation.

3. A spread spectrum radar device according to claim 1, wherein said delay device fixes a corresponding delay time of a distance which is set in advance in detecting said correlation.

4. A spread spectrum radar device according to claim 1, wherein said distance measuring device measures the distance to said object according to the delay time at an intermediate point between the beginning and the end of correlation.

5. A spread spectrum radar device according to claim 1, wherein said distance measuring device measures the distance to said object according to the delay time at the beginning or the end of correlation.

6. A spread spectrum radar device according to claim 1, further comprising a band passing device for passing said frequency-converted signal in a narrow frequency band.

7. A spread spectrum radar device according to claim 6, wherein said pseudorandom noise signal is set according to the relative speed of a supposed moving object so that a shift range due to the Doppler effect of the frequency of a received signal which is correlated, converted to a low frequency and has power concentrated does not overlap said shift range of the frequency of a signal which is not correlated but left spread, and so that the minimum value of the shift range of the frequency of said signal with power concentrated is larger than 0 Hz, and said passing means passes the frequency of the frequency band from the maximum value to the minimum value of the shift range of the frequency of said signal with power concentrated.

8. A spread spectrum radar device which receives a reflected wave from a moving object based on a transmitted wave and detects said object, comprising:

generating means for generating a pseudorandom noise signal;

a transmitter for transmitting a wave whose band is spread by said pseudorandom noise signal;

a receiver for receiving a reflected wave from the object based on said transmitted wave and putting out a received signal;

despreading means for despreading said received signal by said pseudorandom noise signal and detecting a correlation of said received signal with said pseudorandom noise signal;

a frequency converter for converting the frequency of said received signal to a signal with a low frequency;

measuring means for measuring a period of said frequency-converted low frequency signal; and a detector for detecting the speed of said object according to said measured period; and wherein said detector detects the moving direction and relative speed of said object according to a Doppler-shift amount and a Doppler-shift direction of the frequency of said frequency-converted low frequency signal against a set center frequency.

9. A spread spectrum radar device according to claim 8, wherein said radar device comprises a period duration measuring means for measuring the duration of one period or plural periods of said frequency-converted signal in a prescribed period of time, and said period duration measuring means makes the number of said periods to be measured variable according to the period of said frequency-converted signal.

10. A spread spectrum radar device according to claim 8, wherein said radar device further comprises:

a delay device for delaying said pseudorandom noise signal for a prescribed delay time when detecting said correlation, and a distance measuring device for measuring the distance to said object according to said delay time when said correction is detected.

11. A spread spectrum radar device which receives a reflected wave from a moving object based on a transmitted wave and detects a presence of said object and measures speed or distance to said object, comprising:

generating means for setting and generating a code of a pseudorandom noise signal according to the relative speed of a supposed moving object so that a shift range due to the Doppler effect of the frequency of a received signal which is correlated, converted to a low frequency and has power concentrated does not overlap said shift range of the frequency of a signal which is not correlated but left spread, and so that the minimum value of the shift range of the frequency of said signal with power concentrated is larger than 0 Hz, a transmitter for transmitting a wave whose band is spread by said pseudorandom noise signal, a receiver for receiving a reflected wave from an object based on said transmitted wave and putting out a received signal, despreading means for despreading said received signal by said pseudorandom noise signal and detecting a correlation of said received signal with said pseudorandom noise signal, and a band passing device for passing the frequency of bands of a maximum value and a minimum value of the shift range of the frequency of said signal with power concentrated of said despread signal.

12. A spread spectrum radar device which receives a reflected wave from a moving object based on a transmitted wave and detects the presence of said object and measures speed or distance to said object, comprising:

generating means for generating a pseudorandom noise signal;

a transmitter for transmitting a wave whose band is spread by said pseudorandom noise signal, a receiver for receiving a reflected wave from the object based on said transmitted wave and putting out a received signal, despreading means for despreading said received signal by said pseudorandom noise signal and correlating said received signal with the pseudorandom noise signal, and a frequency converter for converting the frequency of said received signal to a signal with a low frequency, and a phase locked loop circuit for passing said frequency-converted low frequency signal in a narrow band, wherein said phase locked loop circuit has a lock-in range or lock range set in a frequency shift range where such a signal is supposed that is correlated at said despreading means, has power concentrated and frequency-converted by said frequency converter.

13. A spread spectrum radar device according to claim 12, wherein;

said phase locked loop circuit includes a phase comparator, a loop filter, a voltage controlled oscillator and a feedback loop from said voltage controlled oscillator to the phase comparator, and measuring device detects the presence of said object and measures speed or distance to said object based on an output from said loop filter.

14. A spread spectrum radar device according to claim 12, wherein;

said phase locked loop circuit includes a phase comparator, a loop filter, a voltage controlled oscillator and a feedback loop from said voltage controlled oscillator to the phase comparator, and a measuring device detects the presence of said object and measures speed or distance to said object based on an output from said voltage controlled oscillator.

15. A spread spectrum radar device according to claim 12, wherein said phase locked loop circuit comprises a frequency divider in the feedback loop from said voltage controlled oscillator to the phase comparator.

16. A spread spectrum radar device according to claim 12, wherein said phase locked loop circuit includes a lock-in range or lock range set so that it does not overlap a frequency shift range where such a spectrum is supposed that is not correlated at said despreading means but left spread and frequency-converted by said frequency converter.

17. A spread radar device which receives a reflected wave from an object based on a transmitted wave and detects said object, comprising:

generating means for generating a pseudorandom noise signal;

a transmitter for transmitting a wave whose band is spread by said pseudorandom noise signal;

a receiver for receiving a reflected wave from the object based on said transmitted wave and outputting a received signal;

despreading means for despreading said received signal by said pseudorandom noise signal and detecting a correlation of said received signal with said pseudorandom noise signal;

a delay device for delaying said pseudorandom noise signal for a prescribed delay time when detecting said correlation; and a distance measuring device for measuring the distance to said object according to said delay time when said correlation is detected.

* * * * *